UNITED STATES PATENT OFFICE.

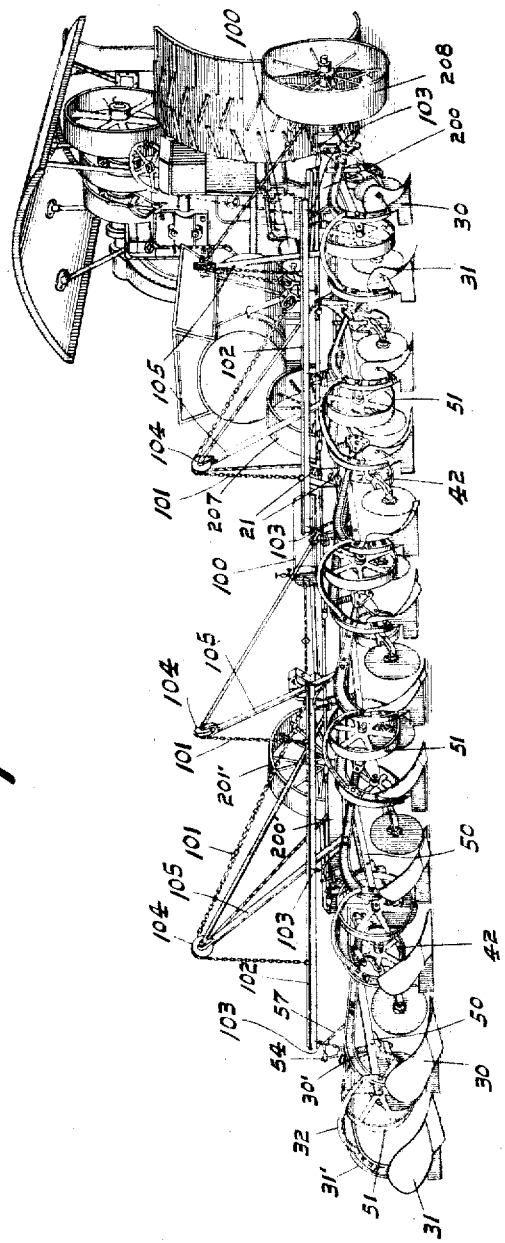

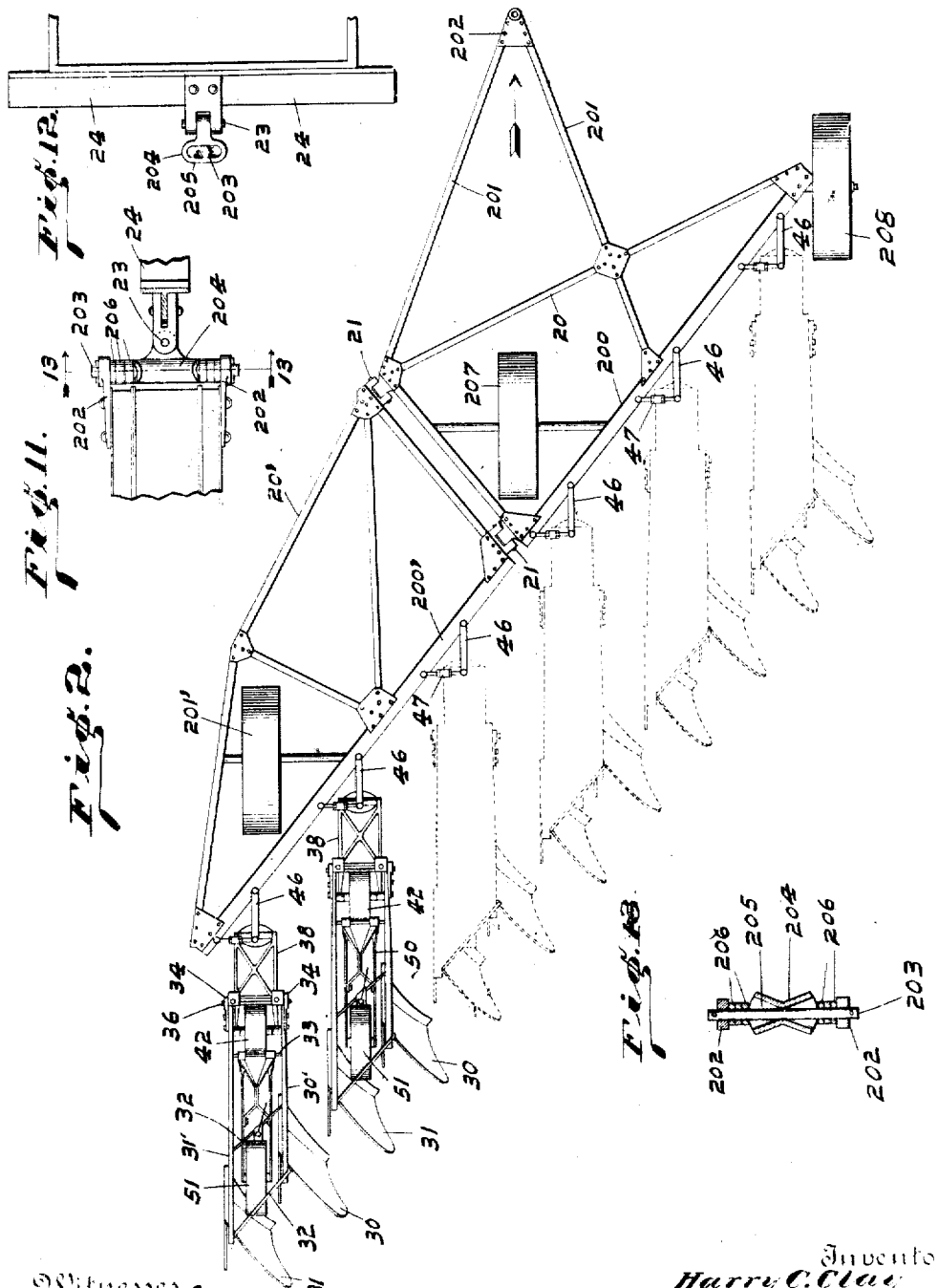

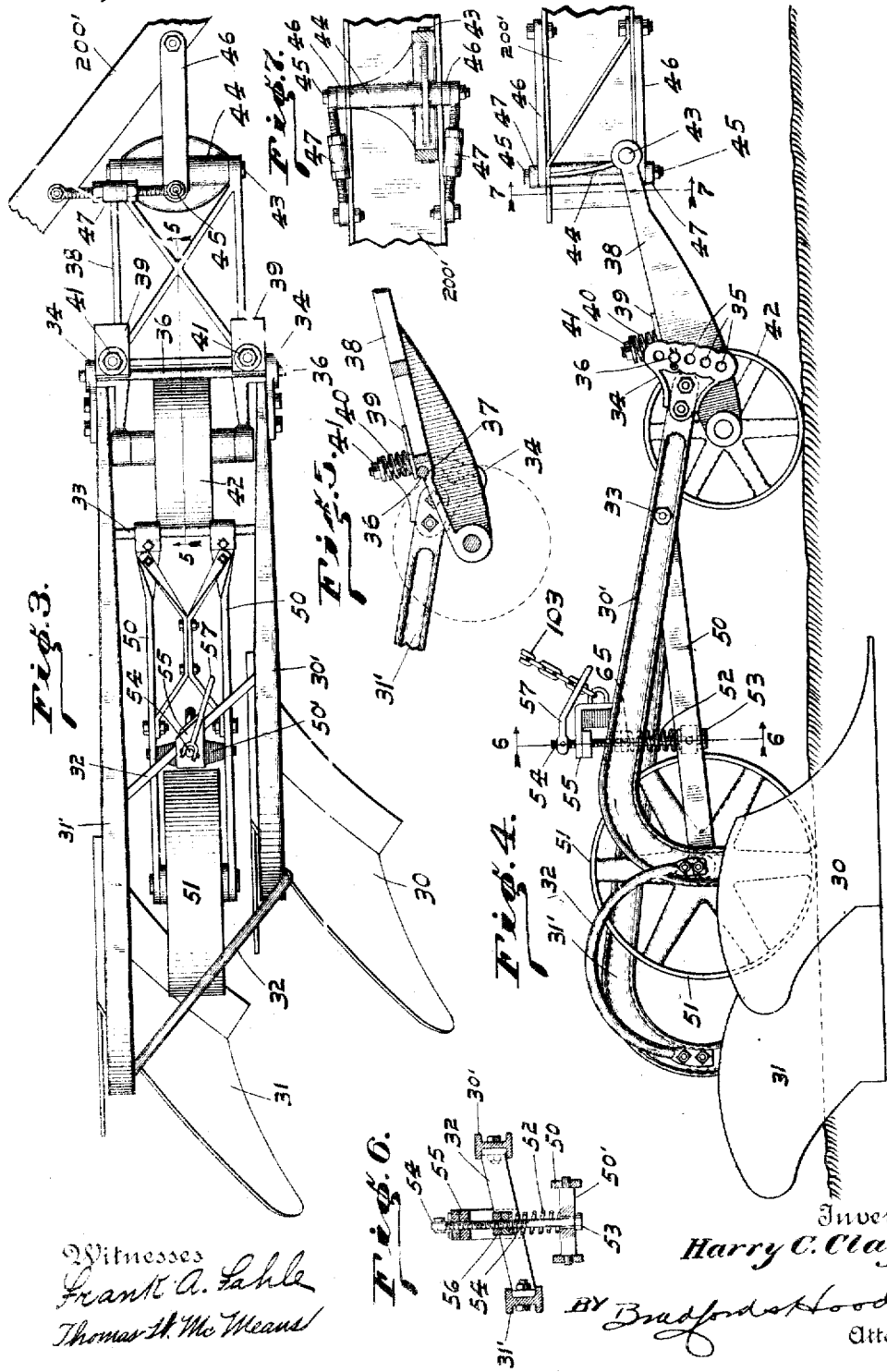

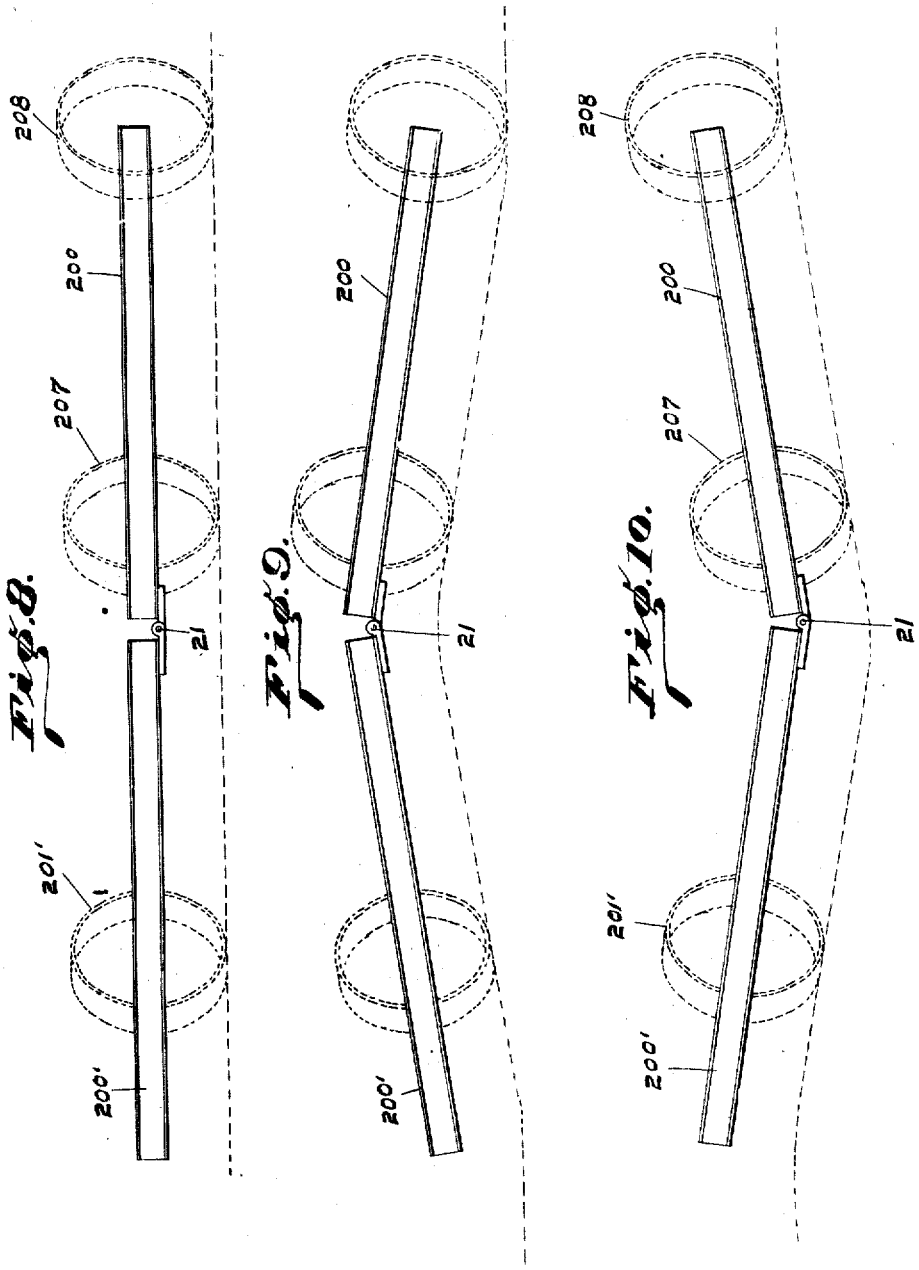

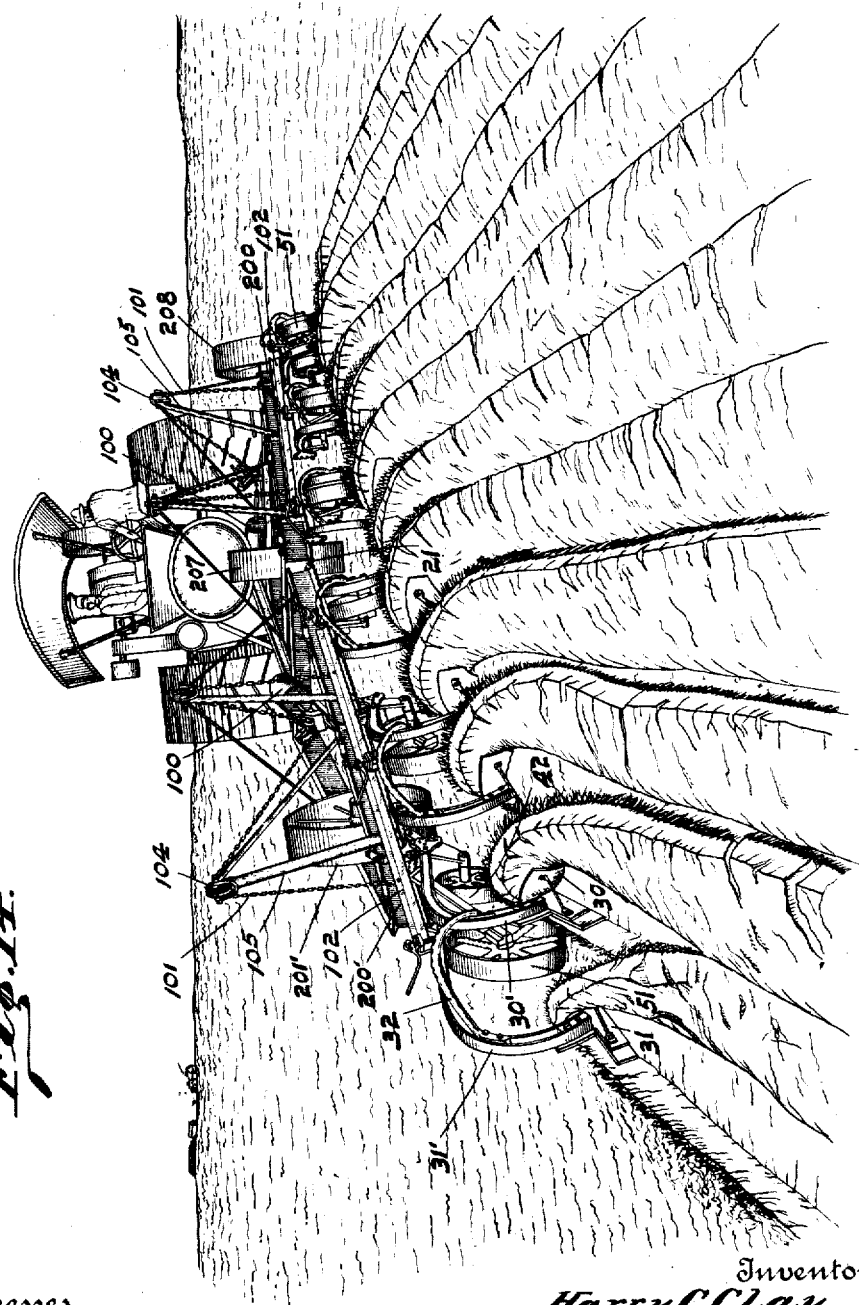

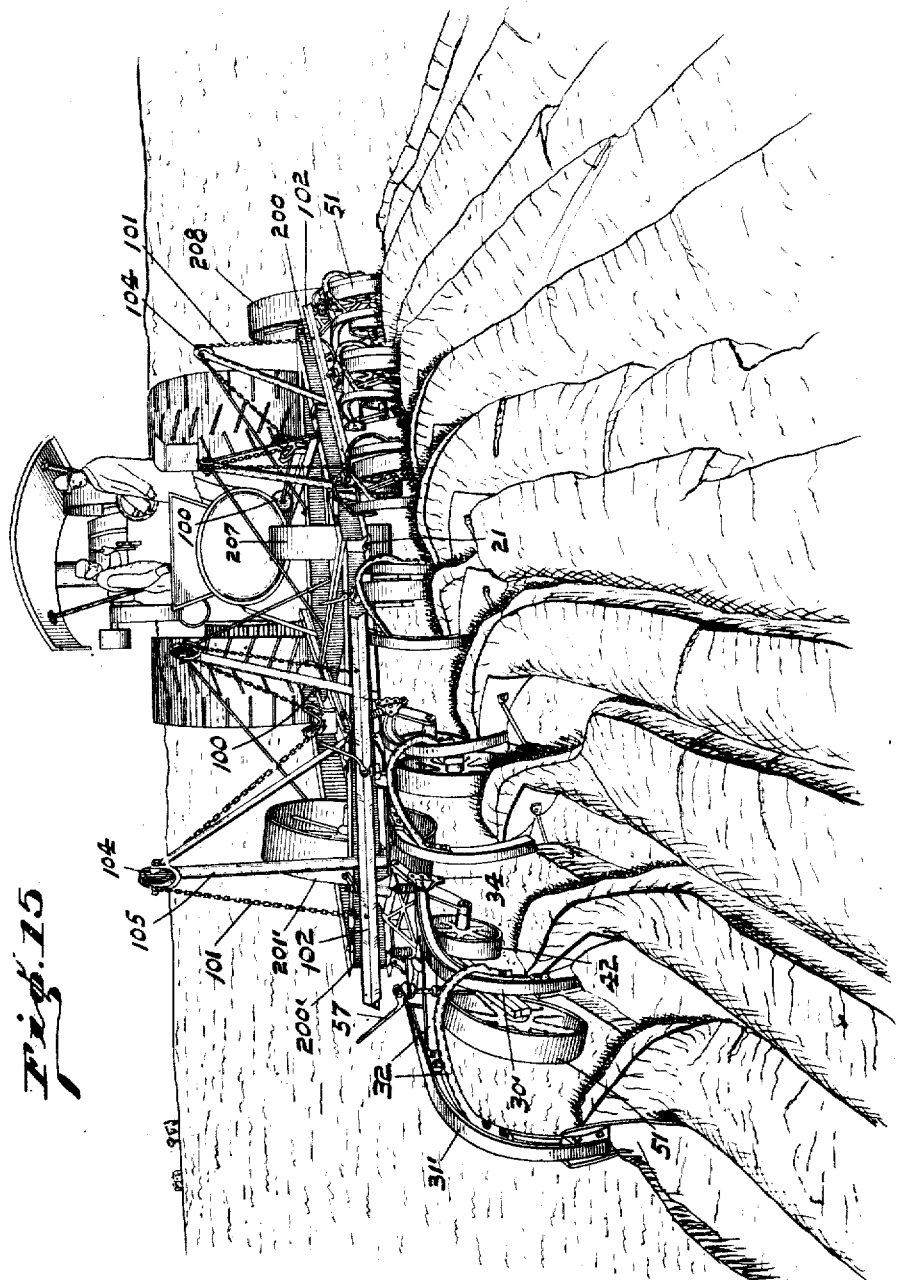

HARRY C. CLAY, OF COLUMBUS, INDIANA, ASSIGNOR TO REEVES & COMPANY, OF COLUMBUS, INDIANA, A CORPORATION OF INDIANA.

GANG-PLOW.

No. 911,703.     Specification of Letters Patent.     Patented Feb. 9, 1909.

Application filed February 8, 1907. Serial No. 356,465.

*To all whom it may concern:*

Be it known that I, HARRY C. CLAY, a citizen of the United States, residing at Columbus, in the county of Bartholomew and State of Indiana, have invented certain new and useful Improvements in Gang-Plows, of which the following is a specification.

The object of my invention is to produce a plowing structure, especially adapted for use with traction engines, of such character that a large number of plows may be simultaneously drawn, each plow doing its particular work correctly irrespective of the inequalities of the ground, and so that the traction engine will be subjected only to the pulling stress of the plows, and the draft frame sufficiently flexible so as not to be strained by inequalities in the ground.

The accompanying drawings illustrate my invention.

Figure 1 is a perspective view of my improved plow in position behind a traction engine, the plowshares resting upon the ground; Fig. 2 a plan of the structure with parts broken away; Fig. 3 an enlarged plan of a plow unit consisting (in the present case) of a pair of plow beams, plowshares, an adjusting mechanism, together with the means for connecting the plow unit to the draft frame; Fig. 4 a side elevation of the parts shown in Fig. 3; Fig. 5, a sectional detail on line 5—5 of Fig. 3; Fig. 6, a section on line 6—6 of Fig. 4; Fig. 7, a sectional detail on line 7—7 of Fig. 4; Figs. 8, 9 and 10, diagrammatic views of the composite draft frame, showing its flexibility to conform to variations in the ground; Fig. 11 a side elevation of a desirable form of universal coupling between the draft frame and the traction engine; Fig. 12 a plan in partial horizontal section of some of the parts shown in Fig. 11; Fig. 13 a section on line 13—13 of Fig. 11; Fig. 14 a perspective view showing the apparatus in operation over a "hump;" and Fig. 15 a similar view showing the apparatus in a hollow.

In the drawings I have shown a composite draft frame composed of two sections 20 and 20' connected by hinges 21 which form a substantially horizontal-articulation between the two sections of the draft frame. It will be readily understood that, if desired, the draft frame may be composed of more than two sections, and that, while the axis of the articulation between the two members 20 and 20' is shown in the drawings as substantially horizontal and as lying at an angle to the line of draft, such an arrangement is not absolutely essential.

The rear beams 200 and 200' of the draft frame members 20 and 20' respectively, are arranged in alinement at an angle to the line of draft to receive the plows and the member 20 is provided, at its forward end, with a frame 201 which, at its forward end, is provided with a vertical draft pin 203. Pin 203 is adapted to receive fitting 204 provided with a vertical opening 205 which, in the line-of-draft dimension is substantially equal to the diameter of the draft pin 203, while in the other horizontal dimension is wider at the top and bottom than at the middle, as clearly shown in Fig. 13 so that, the fitting 204 being held against angular displacement about an axis parallel with the line of draft, the draft pin 203 may swing in said fitting about such an axis. The upper and lower ends of the fitting 204 are arc-shaped and the vertical dimension of the fitting 204 is considerably less than the distance between the pin plates 202—202, washers 206 being such that, by shifting the said washers to points above or below the fitting 204, the angle of draft upon the draft frame may be readily adjusted. Fitting 204 is connected by a pivotal connection 23 with the draft beam 24 of the traction engine, the said pivot 23 lying horizontally and at right angles to the line of draft.

The draft-frame member 20 is supported by a pair of traction wheels 207 and 208 while the member 20' is provided with a traction wheel 201' at a point distant from the hinge connection 21. Of course any suitable supports other than traction wheels may be used, if desired. It will be readily understood that if the draft frame were composed of more than two members, each of the additional members would be provided with a traction wheel for support. It will thus be seen that each of the draft frame members is supported at two points, yet the construction is such that the composite draft frame may conform to inequalities in the ground, as indicated in Figs. 8, 9, 10, 13 and 14, so that it need be only sufficiently strong to withstand the pulling stresses occasioned by the plows. As a consequence, I am able to entirely eliminate the heavy trussed frame which has heretofore been considered necessary as a draft frame for a gang of plows. To this composite draft frame I attach any desirable plowing implements.

In order to cause the plows to move in the line of draft and prevent them from becoming tilted, I have found it desirable to arrange them in plow units comprising two or more plowshares, preferably two, so that each will serve as a balance for the other, and I therefore provide a plurality of plow units, each of which consists of two plowshares 30 and 31 carried by usual plow beams 30' and 31' respectively, which are preferably connected by suitable cross bars 32 so as to form a substantially rigid structure. The plow beams 30' and 31' are provided at their forward ends with a clevis head 34 of ordinary form, said head being provided, as usual, with a plurality of pin-receiving openings 35 adapted to receive a cross pin 36. Pin 36 lies normally in a notch 37 formed in the upper face of a suction frame 38 and said pin is normally held in its notch by one or more plates 39, each of which is held down upon the pin 36 by a spring 40. The tension of springs 40 may be readily adjusted by a nut 41 and the arrangement is such that, if the pull exerted upon pin 36 in the line of draft be too great, as for instance in case a plowshare strikes a stone or stump, said pin will be drawn out of the notch 37, the plates 39 yielding to permit said action. The notch 37 is formed in frame 38 at a point intermediate its length and said frame is supported at its rear end on the ground, conveniently by a traction wheel 42. At its forward end the suction frame is supported by a horizontal pivot 43 lying at right angles to the line of draft. The pivot 43 is carried by a head 44 which is itself pivotally supported on the vertical axis 45 extending between the free ends of a pair of draft links 46—46 which are attached at their forward ends to a member of the composite draft frame. The rear end of each link 46 is braced by a strut 47 which is of a turnbuckle type. By adjusting the turnbuckle-struts the axis 45 may be shifted bodily relative to the draft frame and its vertical angle may also be adjusted so that by this means, the two plowshares of a plow unit may be caused to take uniform and equal cuts and properly track relative to the other plow units.

It will be readily understood that, while I have shown ordinary mold-board plows, any desired plowing implement may be used and the term "plowshares" or "plows" used herein is intended to be sufficiently broad to include any desirable plowing or stirring implement.

In order to assist in the regulation of the depth of the cut of the plowshares, I provide each plow unit with a gage frame 50 which is pivoted at its forward end upon the cross bar 33 and at its rear end carries a gage wheel 51. The gage frame 50 is normally urged downward by means of a spring 52 and the downward movement is limited by the head 53 of a bolt 54 which is threaded up through a bracket 55 carried by the forward cross bar 32, the spring being held between a bar 50' (pivoted in the frame 50) and a pair of nuts 56 carried on the threaded portion of the bolt. The upper end of bolt 54 is provided with a handle 57 by means of which the bolt may be turned so as to thus determine the normal position of the lower side of the gage wheel 51 relative to the lowest part of the plowshares.

In order to lift the plow units out of the ground I provide a lifting cylinder 100 on each member of the draft frame, the piston of each cylinder being connected by chains 101 with a bar 102, connected by short chains 103 with several plow units. The chains 101 pass over pulleys 104 journaled at the upper ends of short masts 105.

In operation;—the traction engine exerts a pull at a single point on the composite draft frame and this frame is free to swing to a limited extent upon any one of three axes, i. e., the horizontal pivot 23 at right angles to the line of draft, the vertical pivot 203 at right angles to the line of draft, and a horizontal axis parallel with the line of draft due to the peculiar formation of the perforation 205 in the fitting 204, so that, no matter what the irregularities of the ground may be, the composite draft frame will not subject the traction engine frame to any twisting stresses. At the same time, the articulations between the members of the composite draft frame provide sufficient flexibility from end to end, transversely of the line of travel, to permit the members of the draft frame to follow the irregularities in the ground without strain. This flexibility of the draft frame is important in assisting in maintaining the various plowshares at a proper depth in the ground irrespective of irregularities in the surface of the ground.

Each plow unit (composed in the present case of two plowing implements) acts independently and is capable of oscillation about the vertical axis 45 and also about the horizontal axis 43 at right angles to the line of draft so that the plow unit will properly trail behind the draft frame, no matter how the line of draft thereon may be changed. By adjusting the turnbuckles 47, the axis 45 may be arranged either accurately vertically or at such slight inclination therefrom as will properly balance the two plowshares 30 and 31, one against the other, so that each plowshare serves to prevent the other from either rising out of the ground or digging too deeply thereinto. By setting the pin 36 in the proper hole 35 of the clevis heads, the plowshares may be given any desired degree of "suction" and, because the point of connection of the plowbeams with the suction frame 38 is intermediate its length, the inequalities of the ground over which the traction wheel 42 of the suction frame travels, will be minimized. By adjusting bolt 54 the gage frame 50 may be raised or lowered so as to determine the depth of cut of the plowshares. The spring 52 is sufficiently strong and under sufficient initial tension to hold the gage frame at its lowest point under normal conditions but, when a stone or other obstruction is engaged by the gage wheel, the gage frame may yield to permit the gage wheel to pass over the obstruction without materially affecting the plowshares.

I claim as my invention:

1. In a plow, the combination, with a draft-frame, of a plow unit comprising a plurality of plows, and a connection between said plow unit and the draft-frame, said connection comprising a pivot substantially horizontal and substantially at right angles to the line of draft, and also comprising a substantially vertical pivot, and means for adjusting said last mentioned pivot toward and from vertical.

2. In a plow, the combination, with a draft-frame, of a plow unit comprising a plurality of plows, and a connection between said plow unit and the draft-frame, said connection comprising a pivot substantially horizontal and substantially at right angles to the line of draft, and also comprising a substantially vertical pivot, and means for adjusting said last mentioned pivot toward and from vertical, and for adjusting said last mentioned pivot bodily transversely of the line of draft.

3. In a plow, the combination of a draft-frame comprising a plurality of members articulated with substantially horizontal connections at materially less than a right angle to the line of draft, and a plurality of plow units trailing the draft-frame and each connected to a member thereof by a connection permitting swing of the trailing end of the plow unit both vertically and transversely but preventing movement of the plow unit about an axis substantially coincident with the line of draft.

4. In a plow, the combination of a draft-frame comprising a plurality of members articulated with substantially horizontal connections at materially less than a right angle to the line of draft, and a plurality of plow units trailing the draft-frame, each of said plow units being attached to a draft-frame member by a connection comprising a pivot substantially horizontal and substantially at right angles to the line of draft and also comprising a substantially vertical pivot, and means for adjusting said last mentioned pivot toward and from vertical, and for adjusting said last mentioned pivot bodily transversely of the line of draft.

5. In a plow, the combination of a draft-frame comprising a plurality of members articulated with substantially horizontal connections at materially less than a right angle to the line of draft, and a plurality of plow units trailing the draft frame, each of said plow units being attached to a draft-frame member by a connection comprising a pivot substantially horizontal and substantially at right angles to the line of draft and also comprising a substantially vertical pivot, and means for adjusting said last mentioned pivot toward and from vertical.

6. In a plow, the combination of a draft-frame comprising a plurality of members articulated with substantially horizontal connections at materially less than a right angle to the line of draft, and a plurality of plow units trailing the draft-frame, each of said plow units being attached to a draft-frame member by a connection comprising a pivot substantially horizontal and substantially at right angles to the line of draft and also comprising a substantially vertical pivot, and means for adjusting said last mentioned pivot bodily transversely of the line of draft.

7. The combination, with a composite draft-frame comprising members articulated with substantially horizontal connections, and suitable supporting wheels for said members, of a draft connection at the forward end of said draft-frame permitting universal movement of the draft-frame, a plurality of plow units each comprising a plurality of plows, a suction frame having a portion resting upon the ground, a substantially horizontal pivotal connection between each suction frame and its plow unit substantially at right angles to the line of draft, yielding means for normally maintaining said pivotal connection, and a substantially vertical pivotal connection between each suction frame and a draft-frame member.

8. The combination, with a composite draft-frame comprising members articulated with substantially horizontal connections, and suitable supporting wheels for said members, of a draft connection at the forward end of said draft-frame permitting universal movement of the draft-frame, a plurality of plow units each comprising a plurality of plows, a suction frame for each plow unit, said suction frame having a portion resting upon the ground, a substantially horizontal pivotal connection between each suction frame and its plow unit substantially at right angles to the line of draft, and a substantial vertical pivotal connection between each suction frame and a draft-frame member.

9. The combination, with a composite draft-frame comprising members articulated with substantially horizontal connections, and suitable supporting wheels for said members, of a draft connection at the forward end of said draft-frame permitting universal movement of the draft-frame, a plurality of plow units each comprising a plurality of plows, a suction frame for each plow unit, said suction frame having a portion resting upon the ground, a substantially horizontal pivotal connection between each suction frame and its plow unit substantially at right angles to the line of draft, a substantially vertical pivotal connection between each suction frame and a draft-frame member, and means for adjusting said last mentioned pivot toward and from vertical, and for adjusting said last mentioned pivot bodily transversely of the line of draft.

10. The combination, with a composite draft-frame comprising members articulated with substantially horizontal connections, and suitable supporting wheels for said members, of a draft connection at the forward end of said draft-frame permitting universal movement of the draft-frame, a plurality of plow units each comprising a plurality of plows, a suction frame for each plow unit, said suction frame having a portion resting upon the ground, a substantially horizontal pivotal connection between each suction frame and its plow unit substantially at right angles to the line of draft, a substantially vertical pivotal connection between each suction frame and a draft-frame member, and means for adjusting said last mentioned pivot toward and from vertical.

11. In a plow, the combination, with a draft-frame, of a suction frame provided with a traction wheel, a connection between the forward end of said suction frame and the draft frame comprising a substantially vertical pivot and a substantially horizontal pivot substantially at right angles to the line of draft, means for adjusting the vertical pivot transversely and angularly relative to the draft-frame, and a plow attached to the said suction frame.

12. In a plow, the combination, with a draft-frame, of a suction frame provided with a traction wheel, a connection between the forward end of said suction frame and the draft frame comprising a substantially vertical pivot and a substantially horizontal pivot substantially at right angles to the line of draft, means for adjusting the vertical pivot transversely relative to the draft frame, and a plow attached to the said suction frame.

13. In a plow, the combination, with a draft-frame, of a suction frame provided with a traction wheel, a connection between the forward end of said suction frame and the draft frame comprising a substantially vertical pivot and a substantially horizontal pivot substantially at right angles to the line of draft, means for adjusting the vertical pivot transversely and angularly relative to the draft-frame, and a plow attached to the said suction frame by a substantially horizontal pivotal connection substantially at right angles to the line of draft.

14. In a plow, the combination, with a draft-frame, of a suction frame provided with a traction wheel, a connection between the forward end of said suction frame and the draft frame comprising a substantially vertical pivot and a substantially horizontal pivot substantially at right angles to the line of draft, means for adjusting the vertical pivot transversely relative to the draft frame, and a plow attached to the said suction frame by a substantially horizontal pivotal connection substantially at right angles to the line of draft.

15. In a plow, the combination, with a draft-frame, of a suction frame provided with a traction wheel, a substantially vertical pivotal connection between said suction frame and the draft-frame, means for adjusting said vertical pivotal connection bodily transversely and angularly relative to the draft-frame, a substantially horizontal pivotal connection between the suction frame and the draft-frame substantially at right angles to the line of draft, and a plow connected to said suction frame at a point intermediate the length of the suction frame.

16. In a plow, the combination, with a draft-frame, of a suction frame provided with a traction wheel, a substantially vertical pivotal connection between said suction frame and the draft-frame, means for adjusting said vertical pivotal connection bodily transversely and angularly relative to the draft-frame, a substantially horizontal pivotal connection between the suction frame and the draft-frame substantially at right angles to the line of draft, and a plow connected to said suction frame at a point intermediate the length of the suction frame by a substantially horizontal pivotal connection at right angles to the line of draft.

17. In a plow, a trailing suction frame having a support carried at its rear end adapted to engage the ground, a trailing plow pivotally connected to an intermediate point of the suction frame by a substantially horizontal connection substantially at right angles to the line of draft, a gage wheel arranged adjacent the digging member of the plow and carried by a member extending forward and pivotally connected to the plow to permit vertical movement of the gage wheel, and yielding means for urging said gage wheel downward to its normal position.

In witness whereof, I have hereunto set my hand and seal at Columbus, Indiana, this 4th day of February, A. D. one thousand nine hundred and seven.

HARRY C. CLAY. [L. S.]

Witnesses:
BELLE DENISON,
BLANCHE HAMILTON.